Sept. 13, 1966 B. D. BEDFORD 3,273,046

INVERTER CIRCUITS WITH INDEPENDENT COMMUTATION CIRCUITS

Filed May 8, 1961 5 Sheets-Sheet 1

INVENTOR.
BURNICE D. BEDFORD
BY Robert P. Strack
ATTORNEY

INVENTOR.
BURNICE D. BEDFORD
BY Robert P. Strack
ATTORNEY

Sept. 13, 1966 B. D. BEDFORD 3,273,046

INVERTER CIRCUITS WITH INDEPENDENT COMMUTATION CIRCUITS

Filed May 8, 1961 5 Sheets-Sheet 3

INVENTOR.
BURNICE D. BEDFORD
BY Robert R. Strack
ATTORNEY

Sept. 13, 1966 B. D. BEDFORD 3,273,046

INVERTER CIRCUITS WITH INDEPENDENT COMMUTATION CIRCUITS

Filed May 8, 1961 5 Sheets-Sheet 4

INVENTOR.
BURNICE D. BEDFORD
BY Robert R. Strack
ATTORNEY

Sept. 13, 1966 B. D. BEDFORD 3,273,046

INVERTER CIRCUITS WITH INDEPENDENT COMMUTATION CIRCUITS

Filed May 8, 1961

5 Sheets-Sheet 5

INVENTOR.

BURNICE D. BEDFORD

BY *Robert R. Strack*

ATTORNEY

United States Patent Office 3,273,046

Patented Sept. 13, 1966

3,273,046

INVERTER CIRCUITS WITH INDEPENDENT COMMUTATION CIRCUITS

Burnice D. Bedford, Scotia, N.Y., assignor to General Electric Company, a corporation of New York Filed May 8, 1961, Ser. No. 108,414
14 Claims. (Cl. 321—45)

This invention relates to static inverter circuits and particularly to inverter circuits operative in conjunction with either pure resistive loads or loads having large reactive components.

The continuously increasing use of inverter circuits in applications which demand long life, ability to operate under adverse conditions, and relative freedom from the requirement of maintenance gives rise to numerous problems of inverter design. Primarily, an inverter converts a direct current to an alternating current which is then applied to a load circuit. Under many operating conditions it is impossible to guarantee that the direct current being supplied to the inverter circuit will always be of constant magnitude. Furthermore, the load in many applications will not be constant but in fact may vary over a broad range, the variations including not only those of current drain but also of power factor.

An object of the present invention is to provide inverter circuits that are continuously and reliably operative with a variable direct current supply voltage.

Another object of the invention is to provide inverter circuits that operate at high efficiency and with reliability and continuity of output irrespective of the power factor of the load.

Another object of the invention is to provide inverter circuits capable of operation over a broad range of frequency outputs with minimal modifications in the basic circuitry.

The instant invention employs a pair of switching devices in series with a direct current source and alternately operative to conduct current from alternate terminals of the direct current source to either a load or an output transformer connected to a load. The switching of current flow from one device to the other, or "commutation," requires two distinct operations: selectively initiating, and selectively terminating, conduction of each switching device. The specific commutating technique employed in a static inverter determines to a large degree the output stability and versatility of the inverter with respect to varying power factor loads and varying frequency requirements.

By controlling commutation with an alternating current source that is independent of the load, it is possible to avoid interaction between the inverter and the load. Inverters using independent commutation are operable with a varying direct current supply under conditions which would otherwise cause erratic commutation, at best. Furthermore, when the commutating source is independent of the load it will be relatively unaffected by the reactive nature thereof. Independent commutation also permits use of commutating pulses that are of fixed magnitude and duration and consequently the inverter may be started equally well under both light and heavy loads.

In spite of the obvious advantages of independently commutated inverters, they have found very little favor in the prior art. One of the reasons for this was the previously existing switching devices. For example, gaseous thyratrons, after being rendered conductive by control voltages on the grids, require the application of a reverse voltage between plate and cathode for a relatively long time before deionization. This reverse voltage, if applied independently, requires considerable power loss in the inversion operation. The semi-conductor art has supplied numerous solid state devices capable of operating with high efficiency, reliability, and speed. In particular, silicon controlled rectifiers are switching devices which have the advantageous features of light weight, great power gain, long life, and in addition require no warm-up time or filament power.

A still more important advantage offered by silicon controlled rectifiers is extremely rapid switching between conducting and nonconducting states in response to short duration impulses. This characteristic makes it practical to develop static inverter circuits employing external impulse commutation. Because the impulse required to render a silicon controlled rectifier nonconductive, need be applied between the anode and cathode of the rectifier for a period of only 10 or 20 microseconds, little average power is needed to perform the cut-off operation of commutation. This short period also makes possible the attainment of higher output frequencies.

A feature of the present invention resides in the use of silicon controlled rectifiers to perform the switching functions in an inverter circuit.

Another feature of the present invention resides in means for externally supplying impulses to selectively terminate conduction in the branches of an inverter circuit and thereby take maximum advantage of the short cut-off time of silicon controlled rectifiers.

From another aspect, a feature of the invention includes the use of impedance means selectively operative to transiently divert current from a conducting controlled rectifier and thereby enable the rectifier to assume its nonconducting state.

As already mentioned, difficulties arise when an inverter circuit is used to drive reactive loads. An inductive load tends to cause current to continue flowing after commutation is initiated by terminating conduction in a previously conducting switching device. A capacitive load, on the other hand, may reverse the current flow in the output before commutation is initiated by terminating conduction in a previously conducting switching device. In both cases, a reverse power flow is imposed upon the inverter circuit which may cause failure.

Another feature of the invention resides in the use of unidirectional current paths shunting the silicon controlled rectifiers to yield a low impedance path in order to return power to the direct current supply when a reactive load is connected, thus, reducing power dissipation and decreasing the recovery time of the inverter following each half cycle of operation.

In accordance with the circuits hereinafter described, the invention includes the use of silicon controlled rectifiers in externally commutated inverter circuits. In the embodiments, each controlled rectifier is shunted by a capacitor which transiently has a low impedence for changing currents. A plurality of commutating means are illustrated for either blocking conduction of the controlled rectifier or encouraging current flow through the capacitor in order to divert current from the rectifier for a sufficient period of time to enable it to assume its nonconducting state. The commutating means comprises impulse generating means which are derived from a circuit entirely independent of the load and consequently there is minimal interaction between inverters and the loads. In order to render the inverter circuits efficient and reliable even when supplying highly reactive loads, unidirectional current paths are provided to return wattless power to the direct current supply.

The novel features of the invention are set forth with particularity in the appended claims. The invention itself, however, both as to its organization and method of operation, together with further objects and features thereof, may best be understood by reference to the following description taken in conjunction with the accompanying drawing wherein:

Figure 6:
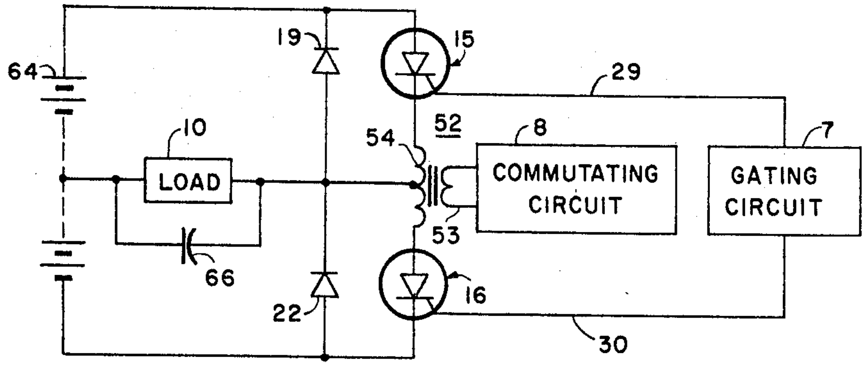
Figure 7:
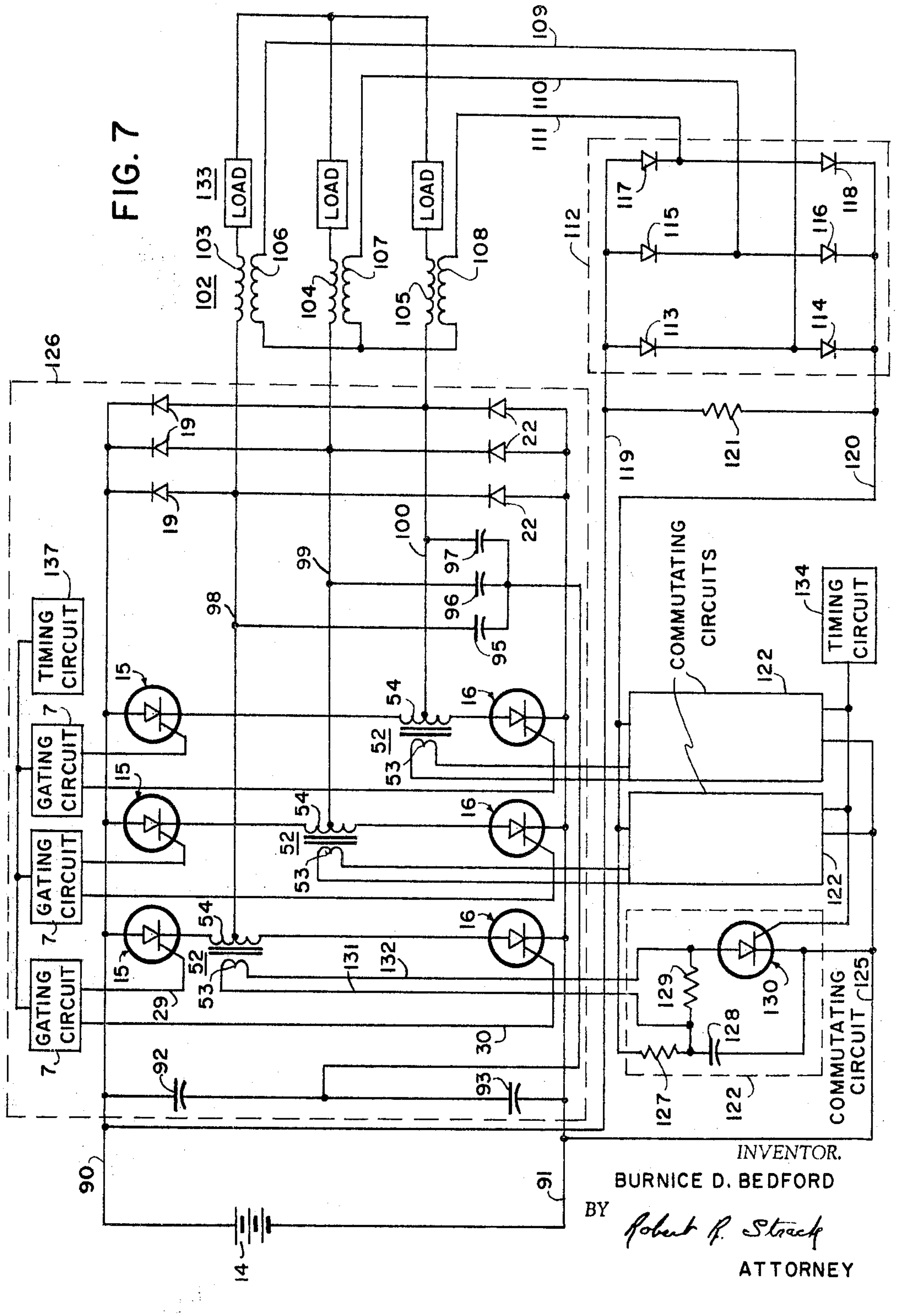

FIG. 6 is a circuit schematic of an inverter circuit embodying the features of the invention wherein external commutating impulses are imposed upon individual controlled rectifiers by means of a commutating transformer having its secondary winding connected between the controlled rectifiers, and wherein the alternating current load is connected between a center tap on the commutating transformer and a center tap on a direct current source; and FIG. 7 is a circuit schematic of a three phase inverter circuit in accordance with the invention wherein means are included for regulating the output thereof.

Figure 1:
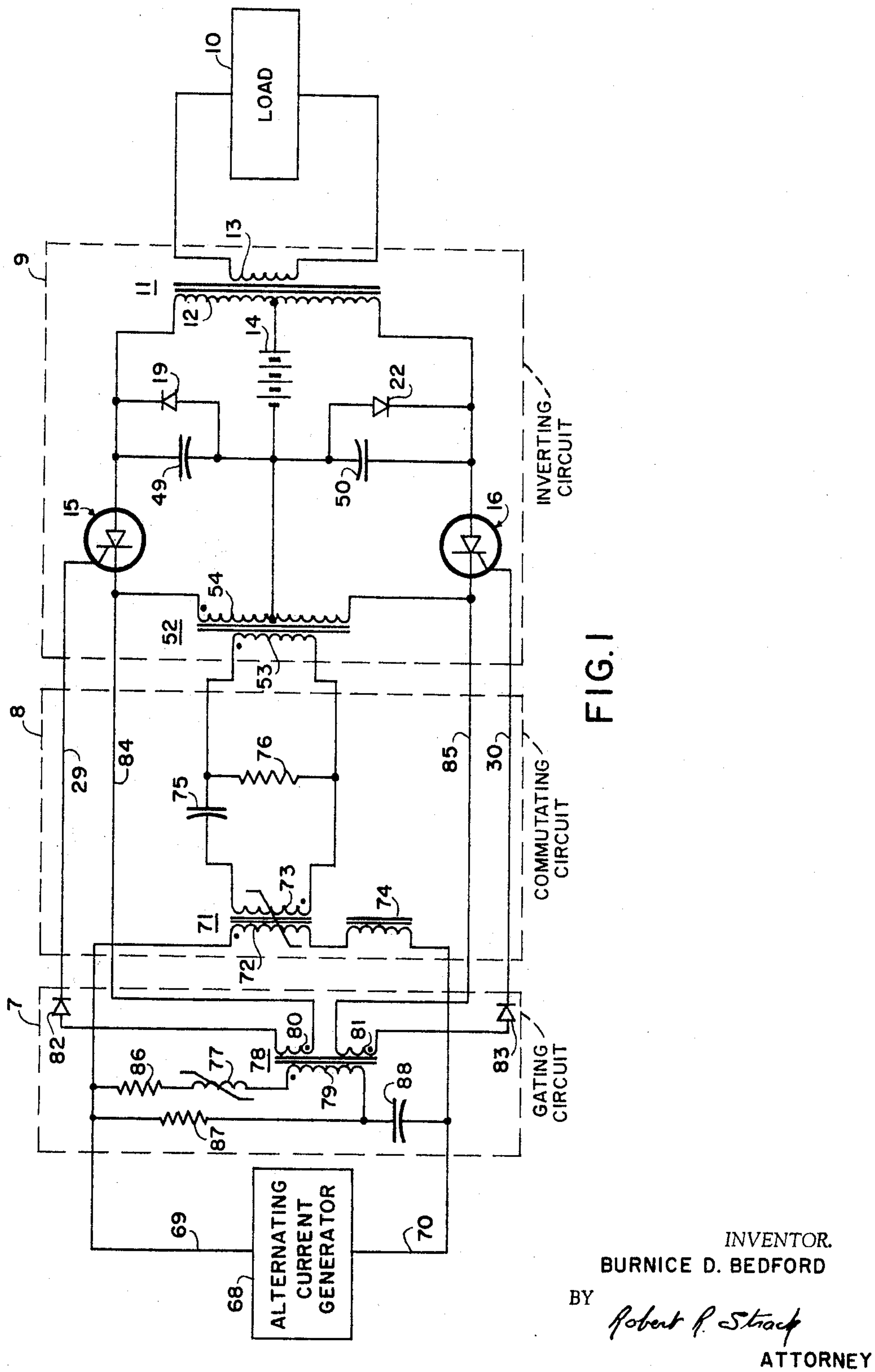
FIG. 1 is a circuit schematic of an inverter circuit interconnected with external commutating circuitry and embodying the features of the invention.

The circuit of FIG. 1 illustrates a typical inverter circuit in accordance with the invention, as connected to external commutating circuitry. The particular arrangement illustrated in FIG. 1 may of course be modified in accordance with particular design objectives.

The inverter circuitry illustrated in FIG. 1 comprises the basic inverter circuit 9, gating circuit 7, commutating circuit 8, and alternating current generator 68. Although commutation involves the functions of initiating and terminating conduction in each rectifier prior to institution of conduction is the other rectifier, these functions have been separated for the purposes of description. The portion of circuitry referred to as gating circuit 7 alternately furnishes impulses to the gate electrodes of controlled rectifiers 15 and 16 in order to render them conductive when they are properly forward-biased. The portion of circuitry referred to as commutating circuit 8 alternately furnishes commutating impulses in order to render controlled rectifiers 15 and 16 nonconductive. Alternating current generator 68 supplies an alternating current which controls both gating circuit 7 and commutating circuit 8.

As each controlled rectifier is switched to a conducting state, it establishes a current path including direct current source 14 and one half of the center-tapped primary 12 of output transformer 11. Thus, controlled rectifier 15 establishes a path for current flow through the upper half of primary winding 12 and controlled rectifier 16 establishes a path for current flow through the lower half of primary winding 12. When sufficient time has elapsed to deliver the desired amount of energy to the load, commutating impulses are applied from commutating circuit 8 via commutating transformer 52, to reverse-bias the conducting controlled rectifier and thereby render it nonconductive. The commutating pulses are delivered at preselected times after the respective rectifiers are triggered into conduction, and are applied for a long enough interval, e.g. 20 microseconds, to render the rectifiers nonconductive.

Before considering the operation of the circuitry in FIG. 1 in response to energization, it will be helpful to examine the elements of the various parts of the circuit.

Inverter circuit 9 comprises an output transformer 11 having symmetrical circuits connected between each terminal of primary winding 12 and the center-tap thereof. Direct current source 14 is connected with is positive terminal to the center-tap of transformer primary 12 and its negative terminal to the center-tap of secondary 54 of commutating transformer 52. Controlled rectifiers 15 and 16 interconnect the end terminals of primary winding 12 with the end terminals of secondary winding 54. These controlled rectifiers are oriented to cause current flow between the output transformer primary 12 and commutating transformer secondary 54 when they are switched to a conducting state. The anode of controlled rectifier 15 is connected to the negative terminal of direct current source 14 by a transient holding capacitor 49 and a rectifier 19 in parallel, rectifier 19 being polarized, as shown, to carry reactive current developed by the counter-electromotive forces generated during changes of current in reactive loads. The anode of controlled rectifier 16 is similarly connected to the negative terminal of direct current source 14 by capacitor 50 and rectifier 22.

Gating circuit 7 comprises components for converting the alternating current from generator 68 into gating pulses for alternate application to the gate electrodes of controlled rectifiers 15 and 16. Generator 68 is connected in the series circuit comprising conductor 69, resistor 87, phase shifting capacitor 88, and conductor 70. The serial combination of resistor 86, saturable reactor 77, and transformer 78 is connected across resistor 87. Transformer 78 is equipped with two secondary windings, 80 and 81, which are alternately effective to supply pulses to the gating electrodes of controlled rectifiers 15 and 16 through conventional rectifiers 82 and 83 respectively.

Commutating circuit 8 is primarily a pulse generating circuit adapted to develop pulses of alternate polarity, having a duration and magnitude sufficient to render controlled rectifiers 15 and 16 nonconductive. FIG. 1 illustrates the use of the same generator, 68, for driving both gating circuit 7 and commutating circuit 8. This arrangement guarantees synchronization, but may be modified in accordance with design requirements. As shown, commutating circuit 8 comprises saturable transformer 71 and inductance 74 serially connected via leads 69 and 70 to alternating current generator 68. The secondary 73 of saturable transformer 71 is connected to the primary 53 of commutating transformer 52 via capacitor 75, and thus supplies alternate polarity commutating impulses thereto. In order to provide damping, resistor 76 is connected across primary winding 53.

*Operation with a resistive load*

Initially, with no output from alternating current generator 68, the inverter circuit produces no current in load 10 because controlled rectifiers 15 and 16 are both nonconducting. Upon energization of alternating current generator 68 a sine wave is applied to the circuit comprising conductor 69, resistor 87, capacitor 88, and conductor 70. Due to the presence of capacitor 88 this current bears a positive phase relationship with respect to the voltage source and consequently a voltage is developed across resistor 87 which precedes in phase the voltage of alternating current generator 68. The voltage across resistor 87 is applied to the series circuit comprising resistor 86, saturable reactor 77, and primary winding 79 of transformer 78. Because reactor 77 presents a high impedance when it is unsaturated the initial current flow in this series circuit is low; however, upon saturation of the core of reactor 77 a rapid increase in current occurs and this increased current induces voltage pulses in secondary windings 80 and 81 of transformer 78. The saturation of reactor 77 occurs a predetermined time following the commencement of each half cycle of current from alternating current source 68.

In accordance with standard drafting convention, during the positive half cycle of current from alternating current generator 68 the voltage applied across primary 79 is positive at the dotted terminal. At this time voltage pulses are induced in secondary windings 80 and 81 which are also positively polarized at the dotted terminals. The voltage induced in secondary winding 81 only has an available conducting path because of the orientation of rectifiers 82 and 83. Thus, during the positive half cycle of voltage from alternating current generator 68 a gating pulse is applied to silicon controlled rectifier 16 via the gating circuit comprising the dotted terminal of secondary winding 81, rectifier 83, conductor 30, gate and cathode electrodes of controlled rectifier 16, conductor 85 and the upper terminal of secondary winding 81.

During the negative half cycle of the signal from alternating current generator 68 the voltage applied to primary winding 79 is negative at the dotted terminal thereof and consequently the voltage induced in secondary windings 80 and 81 is polarized negatively at the dotted terminal. Therefore, a gating pulse is applied to silicon controlled rectifier 15 in the circuit comprising the upper terminal of secondary winding 80, rectifier 82, conductor 29, gate and cathode electrodes of controlled rectifier 15, conductor 80, and the dotted terminal of secondary winding 80.

The application of gating pulses to either silicon controlled rectifier 15 or 16 is effective to establish conduction thereof. This conduction, in view of the magnitude of direct current source 14 will continue after removal of the gating pulse because the anode-to-cathode potential developed by direct current source 14 is sufficient to sustain conduction.

When the positive gating signal is applied between the gate and cathode electrodes of controlled rectifier 15 the rectifier assumes a high current conduction state and a current path exists from the positive terminal of direct current source 14 through the upper half of transformer primary winding 12, controlled rectifier 15, the upper half of secondary winding 54, to the negative terminal of direct current source 14. If a minimum of circuit losses be assumed, the entire direct current voltage appears across the upper half of primary winding 12 and induces a voltage in secondary winding 13 having a particular polarity. The induced voltage in secondary winding 13 causes current flow through load 10 in a first direction.

Conventional transformer action also causes a counter-electromotive force to be developed in primary winding 12 in response to the current flow through rectifier 15. This counter-electromotive force appears across the lower half of primary 12 and is polarized positively on the lower terminal thereof. The effect of this induced voltage is to place a forward biasing voltage on controlled rectifier 16 having a magnitude which is twice that of direct current source 14. In the following description it will be necessary to refer frequently to the magnitude of direct current source 14. For brevity, it will hereinafter be designated "E." Using the terminology, a forward-bias of 2E is applied to controlled rectifier 16.

The charge upon shunting capacitors 49 and 50 is of interest. Because capacitor 50 is effectively in parallel with controlled rectifier 16 it is charged to a value 2E, the junction between it and the anode of controlled rectifier being positive. On the other hand, because the voltage drop across controlled rectifier 15 is minimal when in a conduction state, capacitor 49 has a negligible voltage thereacross only, due to the negligible drop across controlled rectifier 15 and the small voltage drop across the upper half of secondary winding 54.

Figure 2:
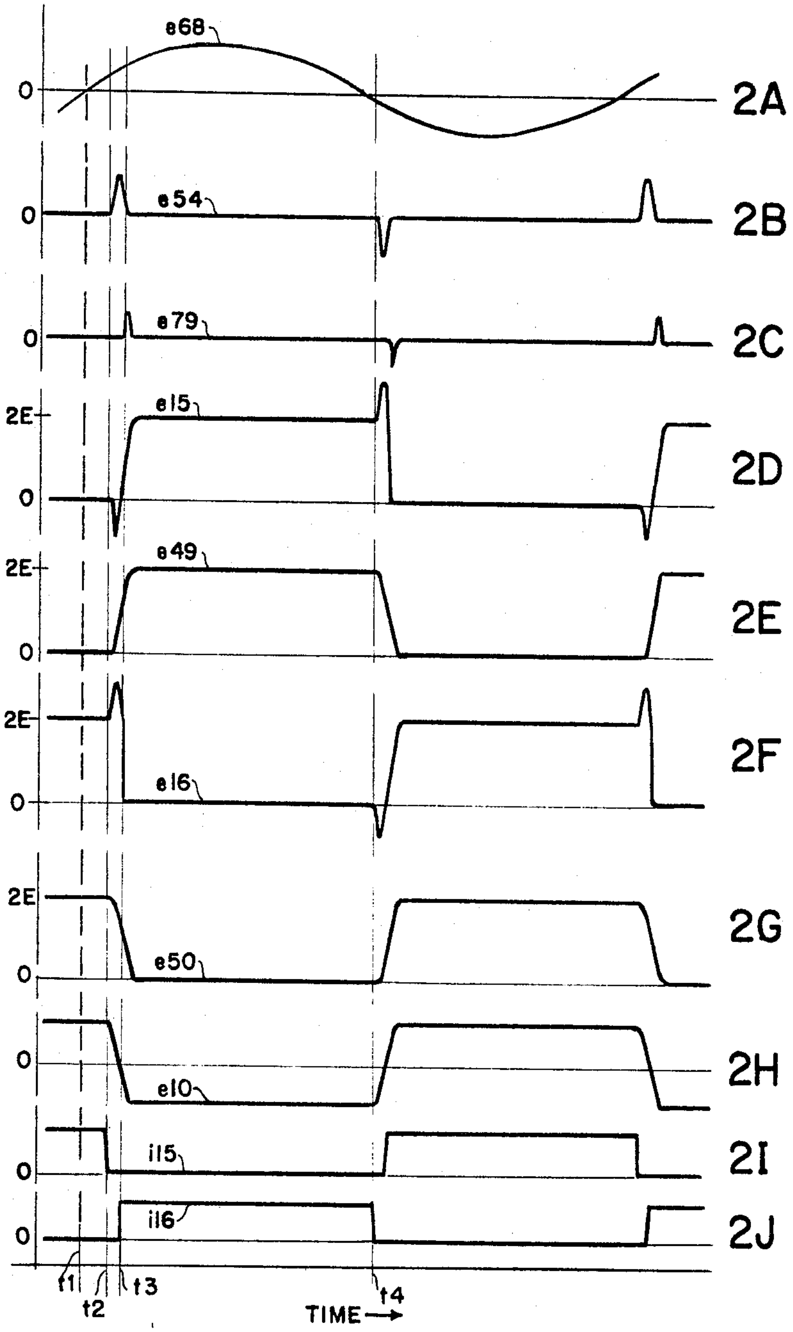
FIG. 2 is a plurality of waveforms illustrating the instantaneous voltage and current at various points in the circuit of FIG. 1 during a typical cycle of operation.

FIG. 2 contains a plurality of waveforms illustrating the instantaneous variations in voltage and current at various points in the circuit of FIG. 1 as a function of time. Each waveform is designated by either "*e*" or "*i*" and a numeral. The latter "*e*" indicates the waveform denotes a voltage, and the letter "*i*" indicates the waveform denotes a current. The numeral indicates the component across, or through, which the voltage or current is measured.

The condition of the various waveforms of FIG. 2 at time $t_1$ represents the condition just described wherein controlled rectifier 15 is in its conducting state. It will be seen for example: that the voltage across capacitor 49, in FIG. 2E, is at approximately zero; that the voltage across controlled rectifier 16, in FIG. 2F, is equal to twice the magnitude of direct current source 14; that the voltage across capacitor 50, in FIG. 2G, is equal to twice the voltage of direct current source 14; that the voltage drop across load 10, in FIG. 2H, is approximately equal to that of direct current source 14 (assuming a 1:1 ratio between each half of primary 12 and secondary 13); and that a continuous current is flowing in controlled rectifier 15, as shown in FIG. 2I.

Once in a conducting state, controlled rectifier 15 continues conducting until a commutating impulse is applied to the cathode thereof. It will be recalled that these impulses are generated in commutating circuit 8. During the positive half cycle of the alternating current supplied by generator 68, current is supplied in the circuit comprising conductor 69, primary 72 of saturable transformer 71, inductance 74, and conductor 70. The current flowing in the primary 72 of saturable transformer 71, during nonsaturation, induces a voltage in secondary winding 73. The voltage induced in secondary winding 73 is positive at the dotted terminal and consequently, capacitor 75 is charged positive on the terminal adjacent to the dotted terminal of primary winding 53 of the commutating transformer 52. When saturable transformer 71 abruptly saturates, transformer action ceases, and the impedance of secondary winding 73 decreases yielding a low impedance path for the discharge of capacitor 75. While discharging, capacitor 75 applies a positive voltage pulse to the dotted terminal of primary winding 53 which induces a positive voltage pulse at the dotted terminal of secondary winding 54. Thus, the dotted end of transformer secondary 54 is positive with respect to the center tap, and controlled rectifier 15 is reverse-biased.

The application of a positive pulse to the cathode of controlled rectifier 15, via transformer secondary 54, is illustrated in the waveforms of FIG. 2 as occurring at time $t_2$. Waveform $e15$, in FIG. 2D, represents the applied commutating pulse as a negative pulse because it represents the voltage between the anode and cathode of controlled rectifier 15, with the anode as the positive reference. Because capacitor 49 has no charge thereon at time $t_2$, the anode of controlled rectifier 15 is essentially clamped to the negative terminal of direct current source 14 when the communtating pulse is applied to the cathode thereof. Thus, the cathode is forced positive with respect to the anode and silicon controlled rectifier 15 ceases conduction. This is illustrated by the waveform $i15$, wherein the current is shown to immediately drop to zero at time $t_2$. In other words, current flow is transiently diverted from controlled rectifier 15 to capacitor 49. The duration of the commutating pulse is sufficient to switch controlled rectifier 15 to its nonconducting state and consequently, even if a forward voltage subsequently appears across the controlled rectifier, it will not conduct until another gating pulse is applied.

Upon termination of conduction in controlled rectifier 15, capacitor 49 immediately begins to charge to the positive voltage of direct current source 14 in the path including the upper half of transformer primary 12. In order to insure that the silicon controlled rectifier 15 has switched to its non-current conducting state before the charge on capacitor 44 becomes sufficiently positive to render it conducting, it is necessary to make capacitor 49 of sufficient size. During the charging of capacitor 49, capacitor 50, which was previously charged to 2E, discharges in the path comprising the lower half of primary 12, seeking a voltage equal to that of the direct current source 14.

It should be understood that the commutating voltage applied via commutating transformer secondary 54 in order to terminate conduction in controlled rectifier 15 is simultaneously applied to controlled rectifier 16. In the case of controlled rectifier 16, the polarity is reversed and consequently, at the instant $t_2$, as shown in FIG. 2F a forward voltage appears between the anode and cathode of controlled rectifier 16 which has a magnitude equal to the sum of the pulse amplitude, the voltage source 14, and the voltage induced in the lower portion of primary winding 12 during conduction of controlled rectifier 15. The controlled rectifiers are chosen to withstand this forward voltage without conduction unless a gating signal is simultaneously applied.

During the positive half cycle of current from alternating current generator 68, as previously pointed out, a gating pulse is applied via the secondary 81 of gating transformer 78 to the gating electrode of controlled rectifier 16. This occurs at time $t_3$. At time $t_3$, therefore, controlled rectifier 16 is switched to a current conduction state and capacitor 50 immediately completes discharging to zero through controlled rectifier 16 and the lower half of transformer secondary 54 at a rate determined by the resonant frequency of the capacitor and secondary winding. The subsequent flow of current is in a path comprising: the positive terminal of direct current source 14, the lower half of primary winding 12, controlled rectifier 16, and the lower half of secondary winding 54, and the negative terminal of direct current suorce 14. This current flow induces a counter-electromotive force in the upper half of primary winding 12 which charges capacitor 49 to a level equal to twice the magnitude of direct current source 14, as shown in FIG. 2E.

During the interval between $t_2$ and $t_3$, the total current induced in load 10 is determined by the difference in the electromotive force developed in primary 12 by the current charging capacitor 49 and by the current flowing through controlled rectifier 16. Once capacitor 49 has become fully charged, the full direct current flows through controlled rectifier 16 and therefore a full voltage is induced in the output secondary 13 having a polarity opposite that previously developed when controlled rectifier 15 was conducting.

This state of operation continues until time $t_4$, when a commutating pulse is applied to extinguish the current flowing through controlled rectifier 16.

In review it will be seen that with each half cycle generated by alternating current generator 68 a commutating impulse is delivered to turn off the conducting controlled rectifier and subsequently a gating impulses is applied to turn on the nonconducting controlled rectifier. The circuit illustrated in FIG. 1 develops the proper phase displacement between the gating and commutating impulses by means of a phase shift in resistor 87 and capacitor 88 and time delays inherent in saturable reactor 77 and saturable transformer 71. As illustrated, saturable reactor 77 requires a longer period of time to reach saturation than saturating transformer 71. In order to achieve the phase displacement required, the voltage applied to saturating reactor 77 is given a positive phase shift by capacitor 88. The circuit details used in achieving the phase relationship described are not germane to the invention.

In accordance with the above described sequence of operation, an alternating current is supplied to load 10 with the frequency determined by generator 68. If the load is reactive, circuit operation is modified because of the fact that during the application of power to a reactive load the current and voltage are not in phase and additional time must be provided for the dissipation of reactive energy that may be stored in the output due to reactive condition in the load.

*Operative with an inductive load*

When load 10 is inductive, rectifiers 19 and 22 are required in order to enable the current that still exists after a controlled rectifier has been switched to a nonconducting state to be dissipated in a low impedance path. For example, if controlled rectifier 15 is initially conducting when a positive commutating impulse is applied via commutating transformer 52, the current path comprising the positive terminal of direct current source 14, the upper half of primary winding 12, controlled rectifier 15, the upper half of commutating transformer secondary 54, and the negative terminal of direct current source 14, is disrupted. When current ceases to flow in controlled rectifier 15 it may instantaneously transfer to capacitor 49 and begin charging as previously described with respect to a resistive load. However, because load 10 is inductive, the charging current of capacitor 49 and the discharging current of capacitor 50 are forced to continue at a constant rate until capacitor 49 is charged to twice the ampitude of direct current source 14 and capacitor 50 is discharged to zero. In order to satisfy the inductive load requirement, a current path is provided from the negative terminal of direct current source 14 through rectifier 22, the lower half of primary winding 12, and back to the positive terminal of direct current source 14. This path is conductive while inductive current flows in the primary windings, and consequently is used for a period of time depending upon the power factor of the load. Thus, when load 10 is inductive, current flows in a reverse direction through direct current source 14 from the time the capacitors have completed their charge transfer until the inductive load current passes through zero.

An inductive load causes additional problems with respect to switching into conduction the nonconducting rectifier, in this case, controlled rectifier 16. In view of the current flow in the reverse direction through direct current source 14 and rectifier 22 when a reactive load is present, if a gating pulse is applied to controlled rectifier 16 during this period the controlled rectifier will not assume a conducting state because its anode is clamped to a voltage equal to the drop across rectifier 22. Once the reactive current has been dissipated, however, the anode of controlled rectifier 16 will be held at a positive voltage having the magnitude of direct current source 14 and consequently, a gating pulse will be effective to establish it in its conducting state. In order to handle a purely inductive load, the gate pulse applied over conductor 30 may be designed to have a duration of 90°. This insures presence of a gating signal when the anode of controlled rectifier 16 has returned to a positive potential. Another mode of operation employs a second pulse at the time the current in rectifier 22 becomes zero. A simple method of attaining this second current pulse is the insertion of a current transformer in series with rectifiers 19 and 22.

*Operation with a capacitive load*

When load 10 is capacitive, the current flowing therethrough will lead the voltage induced in secondary winding 13 by an amount determined by the power factor of the load. By normal transformer action, the current flowing in the secondary 13 tends to induce a voltage in primary winding 12 which will lead the current flowing therethrough as a result of direct current source 14 by an amount determined by the power factor of load 10. Under these load conditions the current flowing through a controlled rectifier, for example, controlled rectifier 15, will decrease to zero before a commutating impulse is applied thereto by secondary winding 54. Following termination of conduction in controlled rectifier 15, the current reversal in transformer 11 is controlled by the inclusion of rectifier 19. During this portion of time a current path exists from the negative terminal of direct current source 14 and includes: rectifier 19, the upper half of primary winding 12, and the positive terminal of direct current source 14.

With a light leading power factor load, the current in rectifier 19 may become zero before the end of a 180° cycle of current flow in controlled rectifier 15. A 90° gate signal requires that the output voltage be supplied by the discharge of capacitor 50 through primary winding 12 until controlled rectifier 16 is gated into conduction. If a gate signal is applied to each controlled rectifier for the entire interval between commutating impulses from secondary winding 54 current flow is restarted in rectifier 15 in order to maintain the square wave of output voltage.

In recapitulation it will be seen that with a resistive load impulse commutation may be employed without modification of the gating and commutating circuits illustrated in FIG. 1; further, with a resistive load rectifiers 19 and 22 are not essential. When a reactive load is being supplied by the inverter circuit of the present invention, low impedance paths must be provided in order to dissipated the reactively caused currents in order to enable the impulse commutation arrangement to function.

*Further embodiments*

It was pointed out during the detailed circuit description of the circuit illustrated in FIG. 1 that at several times during the cycle of operation a forward-bias equal to twice the magnitude of direct current source 14 plus the magnitude of the commutating impulse is applied to each controlled rectifier. The ability to remain in a nonconducting state under the influence of this magnitude of forward-bias is a requirement that must be met by the silicon controlled rectifiers employed in this embodiment.

Figure 3:
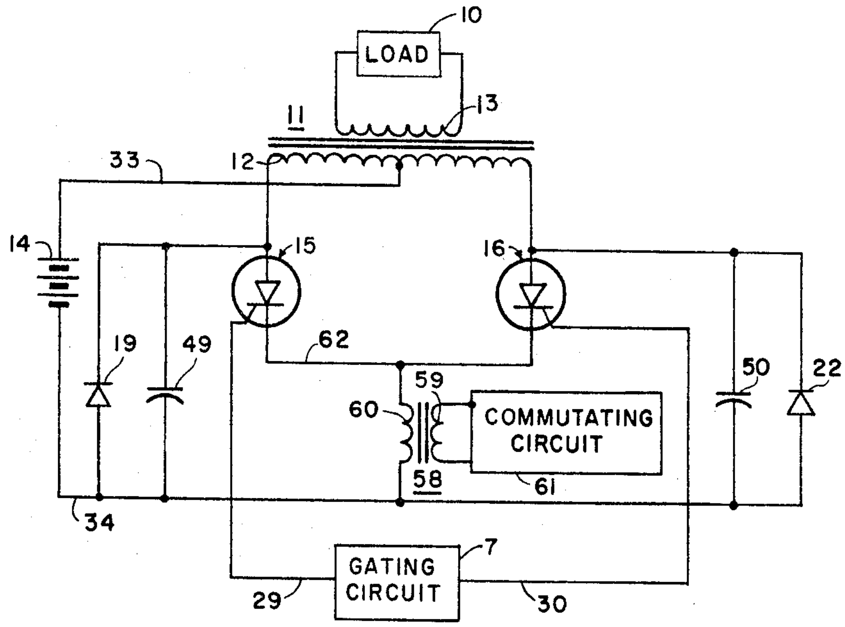
FIG. 3 is a circuit schematic of an inverter circuit embodying the features of the invention wherein a commutating transformer is used to simultaneously apply unidirectional commutating impulses to both controlled rectifiers in order to render them nonconductive.

FIG. 3 is a circuit schematic of an embodiment of the invention wherein the commutating impulses are supplied to an inverter circuit via a commutating transformer 58 which is connected between a lead 62, common to the cathodes of controlled rectifiers 15 and 16, and the negative terminal of direct current source 14.

The inverter circuit of FIG. 3 may be controlled by a gating circuit similar to the gating circuit 7 described with respect to the inverter of FIG. 1. Commutating circuit 61 supplies unidirectional pulses to primary winding 59 of the commutating transformer 58, which in turn induces unidirectional impulses in secondary winding 60. The unidirectional impulses induced in secondary winding 60 are applied by conductor 62 to the cathodes of controlled rectifiers 15 and 16. The duration of application of these impulses is chosen to render the controlled rectifiers nonconducting in accordance with the principles previously considered. As in the case of inverter 9, illustrated in FIG. 1, the commutating circuit 61 and gating circuit 7 should operate in synchronism. Any means may be adopted for accomplishing this, including the use of a common periodic source such as alternating current generator 68 in FIG. 1, in order to drive both commutating circuit 61 and gating circuit 7. Because unidirectional commutating pulses are employed in FIG. 3 the repetition rate thereof will be equal to the second harmonic of the fundamental central frequency.

Obviously, operation of the inverter circuit will be similar to that already described with respect to the inverter circuit 9 of FIG. 1; however, it may be noted that when unidirectional impulses are employed the maximum forward-voltage applied at any time across a controlled rectifier will be equal to twice the magnitude of direct current source 14 only.

Figure 4:
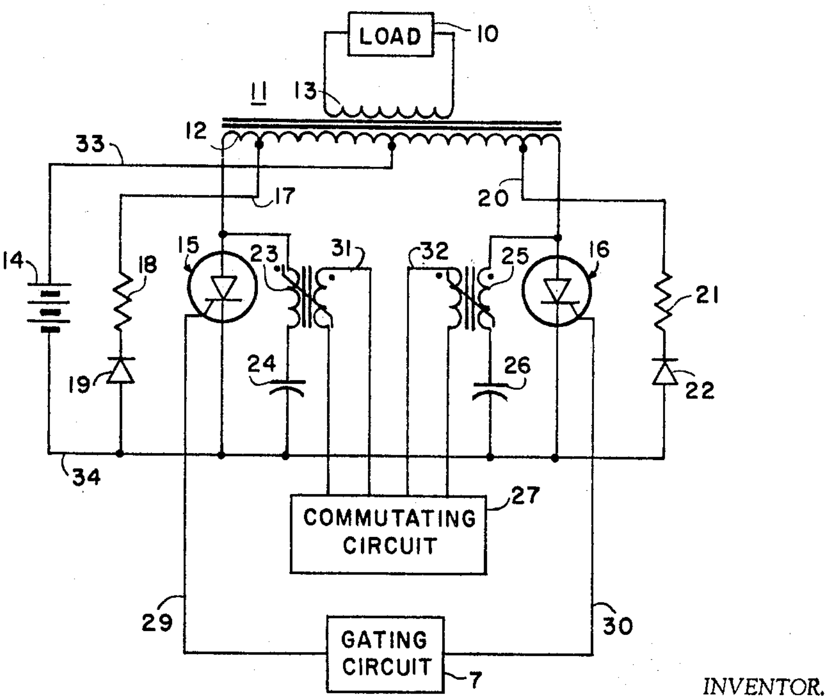
FIG. 4 is a circuit schematic of an inverter circuit embodying the features of the invention wherein a serially connected saturable transformer and capacitor shunt each controlled rectifier and apply commutating impulses thereto in order to render them nonconductive.

FIG. 4 illustrates an inverter circuit utilizing a gating circuit 7 similar to that described in FIG. 1 and employing a serial combination of a capacitor and saturable transformer in order to supply the commutating impulses required to switch the controlled rectifiers to a nonconducting state. In FIG. 4 controlled rectifier 15 is bridged by saturable transformer 23 in series with capacitor 24 and controlled rectifier 16 is bridged by saturable transformer 25 in series with capacitor 26. Commutating circuit 27 alternately supplies a voltage to leads 31 and 32 to switch controlled rectifiers 15 and 16 respectively to their nonconducting state.

In a normal cycle of operation assume that gating circuit 7 has gated controlled rectifier 15 into a conducting state by applying a gating pulse to conductor 29. Commutating circuit 27 applies a positive voltage to the dotted terminal of the primary of saturable transformer 23. In accordance with conventional saturable transformer operation, a voltage is induced in the secondary of saturable transformer 23 which establishes a charge on capacitor 24 that is negative on the upper plate thereof. Upon saturation of the core of saturable transformer 23, transformer action ceases and the impedance presented to current flow by the secondary winding becomes negligible. At this instant, the negative charge accumulated upon tthe upper plate of capacitor 24 is applied to the anode of controlled rectifier 15 and capacitor 24 discharges in a circuit comprising the lower plate thereof, rectifier 19, resistor 18, several turns of primary winding 12, saturable transformer secondary 23, and the upper plate thereof. This discharge path is chosen to have a time constant sufficient to insure the presence of a negative potential on the anode of controlled rectifier 15 for a sufficient period of time to render it nonconductive.

A similar circuit is present for switching controlled rectifier 16 to a nonconducting state. In the case of controlled rectifier 16 the circuitry commprises capacitor 26, saturable transformer 25, rectifier 22, and resistor 21.

Figure 5:
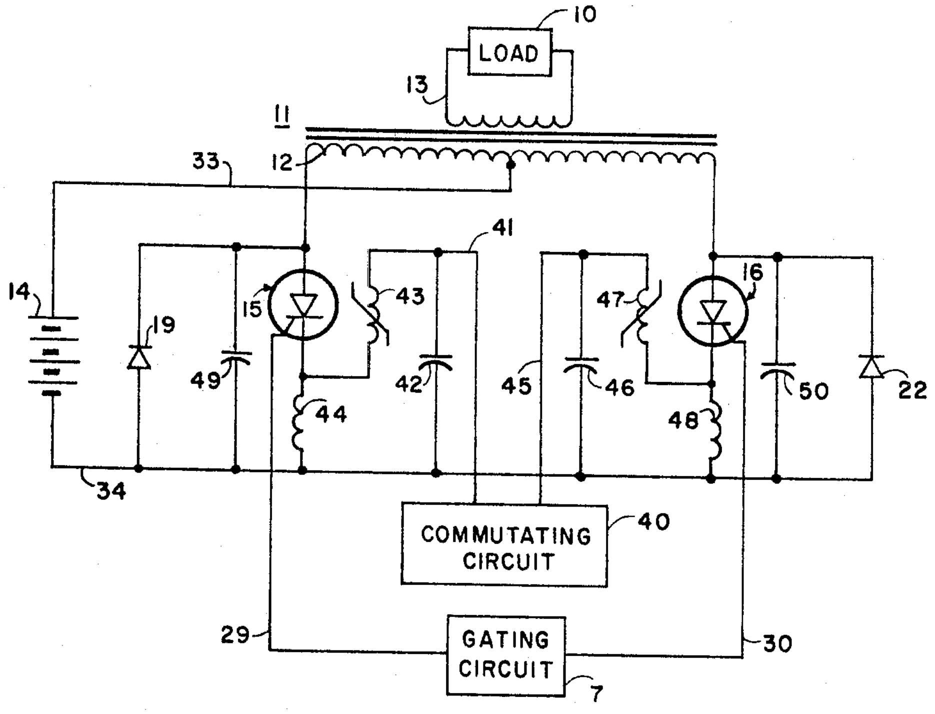
FIG. 5 is a circuit schematic of an inverter circuit embodying the features of the invention wherein a reactance is serially connected with each controlled rectifier and commutating impulses are applied thereto via an individual saturable reactor and capacitor.

FIG. 5 is a circuit schematic of an inverter in keeping with the invention wherein commutating impulses are delivered to each controlled rectifier by means of an inductance in series with each controlled rectifier. A saturable reactor and a storage capacitor convert signals delivered by commutating circuit 40 into pulses for application to the junction between each controlled rectifier and its associated inductance. As illustrated in the figure, controlled rectifier 15 is controlled via inductance 44 which is connected between its cathode and conductor 34. Inductance 44 is periodically pulsed with current from saturable reactor 43 and storage capacitor 42. Controlled rectifier 16 has a similar inductance 48 interconnected between its cathode and conductor 34 and is pulsed via saturable reactor 47 in response to the charge on capacitor 46. Commutating circuit 40 comprises means for alternately supplying a direct current to lead 41 and lead 45.

The functioning of the impulse commutating circuit in FIG. 5 may be understood by considering controlled rectifier 15 to be in a conducting state at the time a positive direct current is applied to conductor 41 by commutating circuit 40. While saturable reactor 43 is a nonsaturated state it offers a high impedance to the direct current and consequently capacitor 42 charges with its upper plate becoming positive. During the charging of capacitor 42, current also flows in the circuit comprising saturable reactor 43 and inductance 44. Within a predetermined period of time saturable reactor 43 becomes saturated and its impedance thereupon drops to a negligible value. Upon saturation of saturable reactor 43, capacitor 42 discharges in the low impedance circuit comprising the upper terminal thereof, saturable reactor 43, inductance 44, and the lower terminal thereof. Inductance 44 presents an impedance which is relatively high and consequently, the voltage drop across it applies a positive potential to the cathode of controlled rectifier 15. During the conduction period of controlled rectifier 15 the voltage on capacitor 49 is determined by the voltage drop across controlled rectifier 15 and inductance 44. Consequently, capacitor 49 is uncharged and serves as a transient clamp on the anode of controlled rectifier 15. Because the anode of controlled rectifier 15 is substantially at the potential of the negative terminal of direct current source 14 and is being transiently held there by capacitor 49, when the cathode thereof is forced positive with respect to the anode, the current is immediately reduced to zero.

FIG. 6 illustrates a circuit in accordance with the invention wherein a center-tapped direct current source 64 is employed, in conjunction with alternate polarity pulse commutation. The impulse commutating circuit 8 and the gating circuit 7 may be developed in the same manner described in FIG. 1. By eliminating the output transformer it is possible to extend operation of the inverter over a wider range of frequencies. Again referring to FIG. 1, if a common alternating current source is used to drive both commutating circuit 8 and gating circuit 7, variation in output frequency may be easily obtained by merely varying the basic oscillating frequency.

Assume that controlled rectifier 15 in FIG. 6, is initially in a conducting state. A current path exists from the positive terminal of direct current source 64 through controlled rectifier 15, the upper half of transformer secondary 54, and load 10, to the center-tap on direct current source 64.

Controlled rectifier 15 is rendered nonconducting by the application of a commutating impulse via commutating transformer 52 which induces a pulse in the upper half of transformer secondary winding 54 that is positive on the upper terminal. On the succeeding half cycle, gating circuit 7 supplies a gating pulse to controlled rectifier 16 via conductor 30. Conduction of controlled rectifier 16 provides a current path from the center-tap on direct current source 64 through load 10, the upper half of transformer secondary 54, and controlled rectifier 16, to the negative terminal of direct current source 64.

FIG. 7 is a circuit schematic of a three-phase inverter embodying the features of the invention and including means for adjusting the magnitude of the commutating impulses in accordance with the output thereof. As shown in the drawing, three-phase inverter 126, comprising three separate inverter stages, converts direct current supplied by direct current source 14 into a three-phase alternating voltage and applies it to load 133 over lines 98, 99, and 100. Three gating circuits, 7, controlled by timing circuit 137 and each individual to a stage of three-phase inverter 126, initiate the application of power to the alternating current line associated with each phase. Three commutating circuits, 122, generally controlled by timing circuit 134 and each individual to a stage of three-phase inverter 126, deliver commutating pulses to the inverter having a magnitude in accordance with the power applied to any one output line therefrom. Three-phase current transformer 102 continuously monitors the current in each of the output lines 98, 99, and 100, and transmits voltages proportional thereto to three-phase rectifier 112. The output of rectifier 112 is a pulsating direct voltage having a magnitude proportional to the magnitude of the alternating current at the output of three-phase inverter 126. This pulsating direct voltage is used as a control signal in order to determine the magnitude of the commutating impulse applied to each stage of inverter 126. The direct voltage is applied to commutating circuits 122 which in turn deliver the commutating impulses that terminate conduction of their respective stages. By thus controlling the impulse magnitude, switching of each stage of three-phase inverter 126 is accomplished with maximum effectiveness.

A detailed description of the circuit elements and their functions during a characteristic portion of operation will clarify their individual functions and interrelationships. Because the elements used for developing each phase of the three-phase output are identical, in general those associated with one phase only will be described.

Before energization of the circuit no current flows in output leads 98, 99, and 100 because direct current source 14 is not of a sufficient magnitude to cause conduction in the controlled rectifiers of the inverter 126. However, upon energization of the circuit illustrated in FIG. 7, timing circuit 137 applies control signals to gating circuit 7 which in turn furnish gating pulses to the electrodes of the controlled rectifiers. Application of these gating pulses is effective to switch the controlled rectifiers to a current conducting state, thereby affording a low impedance path from direct current source 14 to load 133 via the conducting controlled rectifier.

Timing circuit 137 may consist of a three-phase alternating current generator supplying individual phases to each gating circuit 7. With this assumption, gating circuit 7 may be identical to that previously described in conjunction with FIG. 1. It will be recalled that gating circuit 7 in response to an alternating current voltage alternately supplies a positive pulse to conductors 29 and 30. Each of these pulses is applied a predetermined time after the initiation of a half cycle of the sinusoidal current applied by timing circuit 137.

During a full cycle of current from the first phase applied by timing circuit 137 (remembering that succeeding gating circuits are being energized by a signal 120° delayed in time from the preceding gating circuit) the following conduction sequence will be experienced. First, controlled rectifier 15 in the first stage will be switched to conduction; second, 120° controlled rectifier 15 in the second stage will be switched into conduction; third, at 180° controlled rectifier 16 in the first stage will be switched into conduction; fourth, at 240° controlled rectifier 15 in the third stage will be switched into conduction; fifth, at 300°, controlled rectifier 16 in the second stage will be switched into conduction; sixth, at 360°, controlled rectifier 15 in the first stage will again be switched into conduction; and seventh, at 420°, controlled rectifier 16 in the third stage will be switched into conduction. Each controlled rectifier is permitted to remain in the conducting state for a preselected period of time to deliver power to load 133. As will be subsequently described, sufficient commutating impulse power is used to terminate conduction because the magnitude of the impulse is determined by the magnitude of the load current. In general, the operation of each stage is similar to the operation of an individual single phase inverter.

In addition to the controlled rectifiers 15 and 16, each stage of three-phase inverter 126 comprises a commutating transformer 52, the secondary of which is interposed serially between the cathode of controlled rectifier 15 and the anode of controlled rectifier 16. The combined series circuit of controlled rectifier 15, commutating transformer 52, and controlled rectifier 16 is connected between conductors 90 and 91. Direct current source 14 is also connected between conductors 90 and 91 and is polarized in order to create a forward-biasing voltage across the silicon controlled rectifiers. A pair of conventional rectifiers, 19 and 22, are associated with each stage of three-phase inverter 126 in order to dissipate reactive currents encountered when load 133 is of a reactive nature. These rectifiers are connected between each output line and conductors 90 and 91 and are oriented to oppose current flow from direct current source 14. Also connected between conductors 90 and 91 is a pair of capacitors 92 and 93. The junction between these capacitors is effectively a neutral point for the three-phase voltage available at the output of inverter 126 and has connected to it a capacitor 95, 96, or 97, each individually connected to output line 98, 99, or 100, respectively.

Current transformer 102 is serially connected between the output of three-phase inverter 126 and load 133. Primary windings 103, 104, and 105 are arranged to carry the load current in conductors 98, 99, and 100 respectively. Secondary windings 106, 107, and 108 have voltages induced therein proportional to the alternating current flowing in their corresponding primaries and apply these voltages over conductors 109, 110, and 111 respectively to three-phase rectifier 112.

Three-phase rectifier 112 comprises six conventional rectifiers connected in series pairs, 113, 114; 115, 116;

and 117, 118, the rectifiers of each pair being similarly poled as indicated. The junction of each rectifier pair is connected to a respective one of conductors 109, 110, or 111 and the remaining anodes and cathodes of each pair are connected together and to opposite sides of impedance 121. Disregarding source 14, in view of the orientation of the rectifier pairs in rectifier 112 the upper terminal of impedance 121, connected to conductor 119 will always be rendered negative with respect to the lower terminal, connected to conductor 120, in response to an output voltage.

Impedance 121 is connected in series with the commutating circuits 122 across direct current source 14. This circuit may be traced from the positive terminal of direct current source 14 and includes conductors 90 and 119, impedance 121, conductor 120, resistor 127, capacitor 128, and conductors 125 and 91 to the negative terminal of direct current source 14. The effect of this serial connection is to modify the amount of voltage applied across resistor 127 and capacitor 128 of each commutating circuit in accordance with the output of rectifier 112. By thus modifying the voltage applied across these elements, as will be shown, the magnitude of the commutating impulses is modified.

Each commutating circuit 122 is a separate relaxation oscillator comprising a silicon controlled rectifier 130, and a circuit consisting of a resistor 127 and a capacitor 128. The circuit is arranged to provide a forward biasing potential across the silicon controlled rectifier 130 and effect current flow therethrough having a magnitude commensurate with the load current. Thus, upon application of a voltage, a positive current exists for charging capacitor 128 through resistor 127. When the charge on capacitor 128 attains sufficient voltage to sustain controlled rectifier 130 in conduction, controlled rectifier 130 switches to a current conduction state, providing a gating impulse is present on the gate electrode thereof. Gating impulses are applied to each of the relaxation oscillators 122 by timing circuit 134. Timing circuit 134 may be developed in any conventional fashion its function being to provide gating impulses in synchronism with the three-phase alternating current signals of timing circuit 137.

When the first stage of inverter 126 receives a gating signal via lead 29, timing circuit 134 supplies a gating signal to the gate electrode of controlled rectifier 130. Shortly thereafter, capacitor 128 applies sufficient positive voltage via resistor 129 to the anode of controlled rectifier 130 to render it conducting. At this time controlled rectifier 130 furnishes a low impedance path to the circuit comprising the positive terminal of source 14, conductors 90 and 119, impedance 121, conductor 120, resistors 127 and 129, conductors 125 and 91, and the negative terminal of direct current source 14. Current flow through resistor 129 yields a voltage drop thereacross which is applied to primary winding 53 of commutating transformer 52 via conductors 131 and 132. This impulse, is transmitted through commutating transformer 52 and applies a positive pulse to the cathode of controlled rectifier 15, and simultaneously, applies a negative pulse to the anode of controlled rectifier 16. These impulses are obviously of a magnitude effective to terminate conduction in either rectifier. In order to yield positive and negative effects respectively upon controlled rectifiers 15 and 16 the centertap of secondary winding 54 is transiently held to neutral via capacitor 95.

Commutating circuits 122 operate as relaxation oscillators because upon discharge of capacitor 128 a forward voltage of sufficient magnitude to sustain current is no longer present and controlled rectifiers 130 cease conduction. It is thus seen that the voltage applied to primary winding 53 is an impulse, having a magnitude determined by the joint energy of source 14 and rectifier 112.

When the amount of energy delivered to load 133 is increased, the voltage applied across resistor 127 and capacitor 128 is greater than that normally encountered, causing more complete charging of capacitor 128 and consequently increasing the magnitude of the commutating impulse applied to the conducting controlled rectifier. This condition is achieved in the circuit of FIG. 7 because when the output on lines 98, 99, and 100 increases in magnitude, the output of rectifier 112 increases in magnitude. This increase causes a smaller voltage drop across resistor 121 and consequently a larger current flow through the remaining series paths comprising resistor 127 and capacitor 128. It may thus be seen that when the output voltage of three-phase inverter 126 increases, the charging time of capacitor 128 decreases, and larger commutating impluses are applied to remove power delivered to the load by cutting off the rectifier. In the event the load current decreases, the compensation causes smaller commutating impulses to be delivered to the individual controlled rectifiers within each stage of three-phase inverter 126.

A plurality of embodiments of the present invention have been described above. In each of these embodiments an external commutating circuit supplies commutating impulses to controlled rectifiers of an inverter circuit. Each embodiment also includes unidirectional current conducting paths in order to insure and permit reliable and continuous operation when serving reactive loads of either leading or lagging power factor.

While there have been shown particular embodiments of this invention, it will, of course, be understood that it is not wished to be limited thereto since modifications can be made both in the circuit arrangements and in the instrumentalities employed and it is contemplated in the appended claims to cover any such modifications as fall within the true spirit and scope of the invention.

What is claimed as new and desired to be secured by Letters Patent of the United States is:

1. An inverter comprising a controlled rectifier connected in series with a direct current source and one-half of the primary of an output transformer, a source of alternating current, means responsive to said alternating current to initiate conduction in said controlled rectifier, commutating means connected to said controlled rectifier for supplying a short duration impulse thereto to terminate conduction, and unidirectional current conducting means connected in opposition across said controlled rectifier.

2. An inverter supplying a reactive load from a direct current source, comprising, a pair of controlled rectifiers connected to conduct current in alternate directions through said load, a source of periodic signals, means responsive to said periodic signals to alternately render said controlled rectifiers conductive, commutating means responsive to said periodic signals operative to render said controlled rectifiers nonconductive a determinable time after conduction is initiated therein, an unidirectional ccurrent conducting means connected to provide a low impedance path for current due to electromotive forces generated within said load.

3. An inverter for supplying a load from a direct current source comprising a pair of controlled rectifiers having a first and second conducting electrode and a gate electrode connected to conduct current in alternate directions through a load, a source of periodic signals, means responsive to said periodic signals to alternately energize said gate electrodes and render said controlled rectifiers conductive, capacitive means shunting the conducting electrodes of each controlled rectifier and effective to transiently hold the potential thereof at the voltage level determined by the charge on the capacitive means, commutating means responsive to said periodic signals operative to transiently divert current from said conducting electrodes to said capacitive means and render said controlled rectifiers nonconductive a determinable time after conduction is initiated therein, and unidirectional current conducting means connected to provide a low impedance path for currents generated in said load and present during nonconduction of both said controlled rectifiers.

4. An inverter comprising a controlled rectifier connected in series with a direct current source and one-half of the primary of an output transformer, said controlled rectifier having anode, cathode, and gate terminals, unidirectional current conducting means connected in opposition between said anode and cathode terminals, a source of alternating current, means responsive to said alternating current to apply pulses to said gate terminal to render said controlled rectifier conductive, a source of control signals electrically isolated from said output transformer, and commutating means directly connected to said controlled rectifier and responsive to said control signals to apply a reverse bias between said anode and cathode terminals to render said controlled rectifier nonconductive.

5. An inverter as defined in claim 4 wherein said commutating means comprises a commutating transformer, one-half of the secondary of said commutating transformer being serially connected between said cathode terminal and said direct current source, and the primary of said commutating transformer being supplied by said control signal source.

6. An inverter as defined in claim 4 wherein said commutating means comprises a commutating transformer, the secondary of said commutating transformer being serially connected between said cathode terminal and said direct current source, the primary of said commutating transformer being supplied by said control signal source.

7. An inverter as defined in claim 4 wherein said commutating means comprises energy storage means and means responsive to said control signals connected in series between said energy storage means and said anode terminal, said means delivering energy to said energy storage device and being selectively operative to establish a low impedance path therethrough.

8. An inverter as defined in claim 4 wherein said commutating means comprises inductive means serially connected in circuit with said controlled rectifier, energy storage means supplied by said control signals, and gating means operative upon storage of a preselected charge in said energy storage means to transmit said charge to the junction between said controlled rectifier and said inductive means.

9. An inverter as defined in claim 8 in combination with energy storage means shunting said serially connected circuit comprising said inductive means and said controlled rectifier.

10. An inverter comprising an output transformer having a center-tapped primary, a source of direct current with one terminal connected to a reference point and the other terminal connected to said center-tap, a controlled rectifier with two conducting electrodes and a gate electrode having said conducting electrodes serially connected between one end of said primary and said reference point, control means operable to apply a voltage to said gate electrode to render said controlled rectifier conducting, commutating means directly connected to a first of said conducting electrodes and operative at preselected times following application of each said voltage to said gate electrode to apply a reverse bias impulse to said first conducting electrode and unidirectional current conducting means connected between said one and of said primary and said reference point and polled in opposition to said controlled rectifier.

11. An inverter circuit as defined in claim 10 wherein said commutating means comprises a commutating transformer having the center of the secondary thereof connected to said reference point and one terminal of said secondary connected to said first conducting electrode, and a source of control voltage electrically isolated from said output transformer, the primary of said commutating transformer being supplied by said control voltage.

12. An inverter circuit as defined in claim 10 wherein said commutating means comprises a commutating transformer, the secondary of said commutating transformer being serially connected between one said conducting electrode and said reference point, and a source of control voltage impulses electrically isolated from said output transformer, the primary of said commutating transformer being supplied by said control voltage impulses.

13. The inverter as defined in claim 12 in combination with unidirectional current conducting means connected between the second of said conducting electrodes and said reference point and poled in opposition to said controlled rectifier, and energy storage means in parallel with said unidirectional current conducting means.

14. An inverter circuit as defined in claim 10 wherein said commutating means comprises a source of control voltage electrically isolated from said output transformer, energy storage means, and means responsive to said control voltage to charge said energy storage means and operative a predetermined time after said control voltage is applied to establish a low impedance path between said first conducting electrode and said energy storage means.

References Cited by the Examiner

UNITED STATES PATENTS

| | | | |
|---|---|---|---|
| 2,443,100 | 3/1945 | Edwards | 321—36 X |
| 2,486,176 | 10/1949 | Klemperer | 321—56 X |
| 2,785,370 | 3/1957 | Levy | 321—39 X |
| 2,872,635 | 2/1959 | Lawn | 321—36 X |
| 2,909,681 | 10/1959 | Schlemm | 307—106 |
| 2,953,735 | 10/1960 | Schmidt | 321—5 |
| 3,010,062 | 11/1961 | Van Emden | 321—27 X |
| 3,089,965 | 5/1963 | Krizek | 307—21.5 |

FOREIGN PATENTS

| | | |
|---|---|---|
| 665,071 | 9/1938 | Germany. |
| 807,978 | 1/1959 | Great Britain. |

References Cited by the Applicant

UNITED STATES PATENTS

| | | |
|---|---|---|
| 2,008,533 | 7/1935 | Willis. |
| 2,020,922 | 11/1935 | Von Issendorff. |
| 2,026,358 | 12/1935 | Petersen. |
| 2,090,054 | 8/1937 | Lamm. |
| 2,169,031 | 8/1939 | Slepian. |
| 2,338,118 | 1/1944 | Klemperer. |
| 2,619,617 | 11/1952 | Pakala. |

JOHN F. COUCH, *Primary Examiner.*

SAMUEL BERNSTEIN, LLOYD McCOLLUM, MILTON O. HIRSHFIELD, *Examiners.*

D. J. YUSKO, J. J. KISSANE, M. WACHTELL, *Assistant Examiners.*